Figure 1:
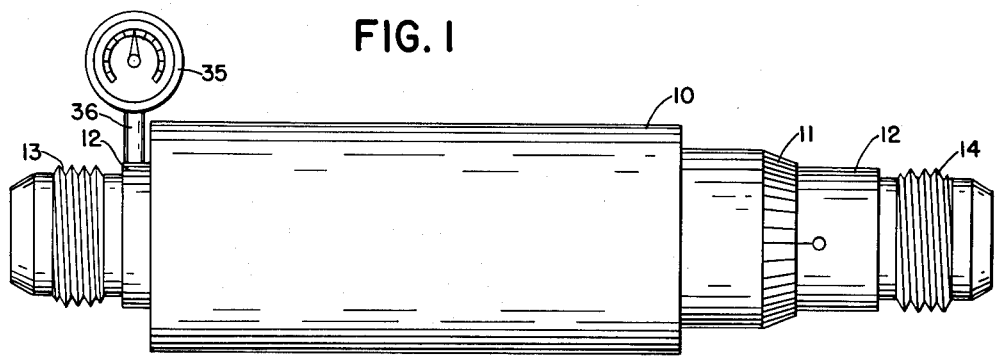

Sept. 7, 1965      S. LEHRER      3,204,459

ADJUSTABLE VENTURI

Filed April 23, 1962      2 Sheets-Sheet 1

STANLEY LEHRER
INVENTOR

BY Ralph E. Bitner
ATTORNEY

Sept. 7, 1965 S. LEHRER 3,204,459
ADJUSTABLE VENTURI
Filed April 23, 1962 2 Sheets-Sheet 2
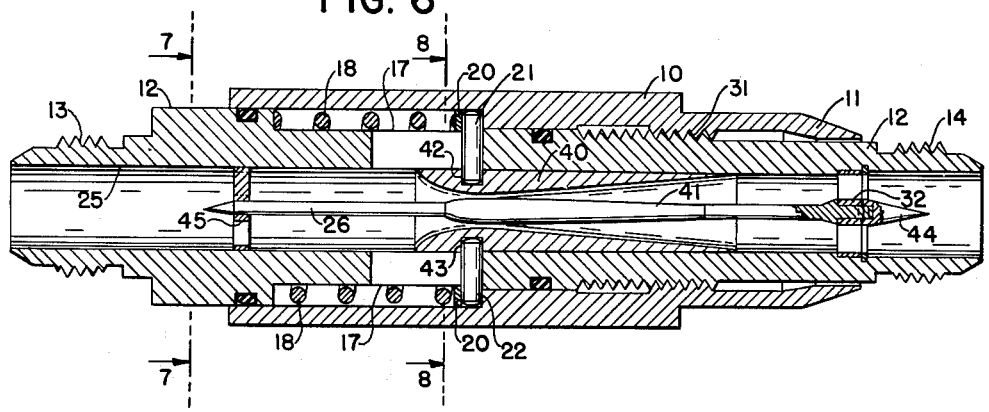
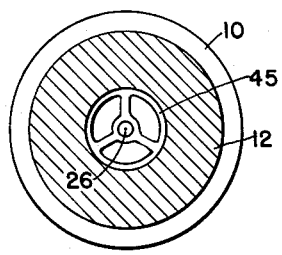
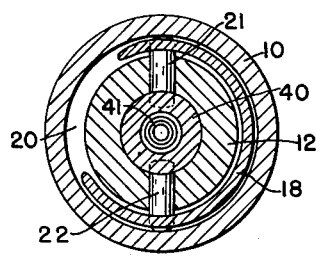
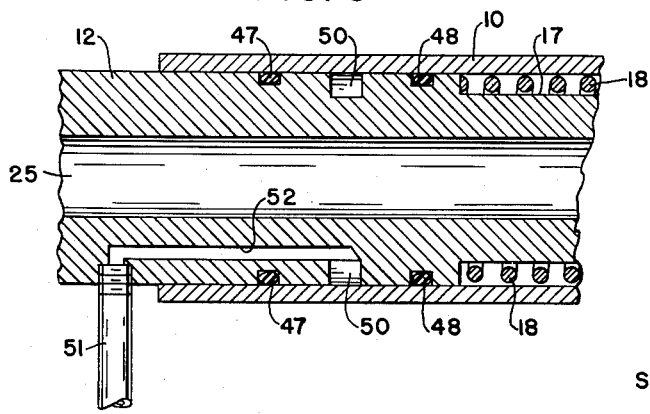
STANLEY LEHRER
INVENTOR
BY Ralph E. Bitner
ATTORNEY

United States Patent Office 3,204,459
Patented Sept. 7, 1965

3,204,459
ADJUSTABLE VENTURI
Stanley Lehrer, Pompton Lakes, N.J., assignor, by mesne assignments, to Astrosystems International Inc., Fairfield, N.J., a corporation of New Jersey
Filed Apr. 23, 1962, Ser. No. 189,471
3 Claims. (Cl. 73—213)

This invention relates to an adjustable venturi which is designed to control the flow of a liquid through a conduit. The invention has particular reference to an adjustable throat whch can be changed without altering the pipe connections and without disrupting the flow within the conduit.

The usual type of venturi construction is employed in conjunction with two pressure measuring devices, one connected on the upstream side of the venturi and the other connected on the downstream side. The difference in pressure is directly proportional to the flow of fluid through the constriction and many such devices have been used in the chemical industry for some time. The present adjustable venturi is connected within a conduit system and a pressure measuring device is connected only to the upstream portion of the system. If the difference in pressure is great enough, the flow may be determined with great accuracy by only this one measurement. This condition is known as flow with cavitation in the throat (region of greatest constriction) and exists as long as the pressure on the downstream side is less than 80%–90% of the pressure on the upstream side.

In prior installations of this type of calibrated constriction, it was necessary to completely dismantle the piping system and insert another calibrated constriction in order to change the flow characteristics.

One of the objects of this invention is to provide an improved adjustable venturi which avoids one or more of the disadvantages and limitations of prior art arrangements.

Another object of the invention is to reduce the time required for changing the flow of a fluid through a calibrated constriction.

Another object of the invention is to increase the safety conditions while working with poisonous gasses and liquids.

Another object of the invention is to provide a calibrated scale which may be direct reading in terms of volume of fluid passed per unit time.

Another object of the invention is to enable an operator to change a fluid flow to a known rate by simply turning a barrel.

The invention comprises a constriction of the usual venturi type having an outer annular constriction which is smooth and presents little friction to the passing fluid. An inner pin is positioned within the outer constriction and is made with a variable transverse cross section. Adjustable means are provided for moving the inner pin relative to the outer annular constriction in an axial direction. Calibration means are provided for denoting the relative position of the inner pin and the outer annular constriction.

For better understanding of the present invention, together with other and further objects thereof, reference is made to the following description taken in connection with the accompanying drawings.

Figure 2:
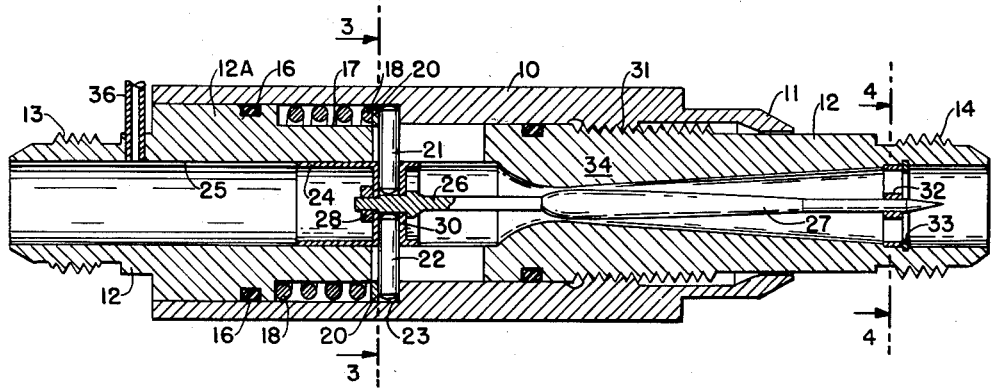
Figure 3:
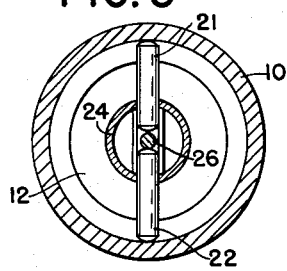
Figure 4:
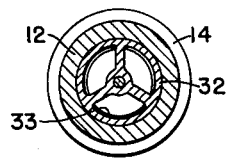
Figure 5:
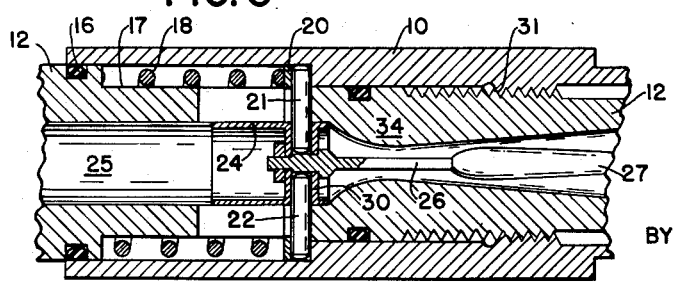

FIG. 1 is a side view of the adjustable venturi.
FIG. 2 is a cross sectional view of the venturi shown in FIG. 1.
FIG. 3 is a cross sectional view of the venturi shown in FIG. 2 and is taken along line 3—3 of that figure.
FIG. 4 is a cross sectional view of the venturi shown in FIG. 2 and is taken along line 4—4 of that figure.
FIG. 5 is a partial cross sectional view similar to FIG. 2 but with the pin moved to a position of maximum flow.
FIG. 6 is a cross sectional view similar to FIG. 2 except that the pin is fixed to the conduit while the annular constrictive portion is movable.
FIG. 7 is a cross sectional view of the venturi shown in FIG. 6 taken along line 7—7 of that figure.
FIG. 8 is a cross sectional view of the venturi shown in FIG. 6 and is taken along line 8—8 of that figure.
FIG. 9 is a partial cross section of the venturi showing how a drain pipe may be added to the assembly.

Referring now to FIGS. 1, 2, 3, and 5, the venturi comprises an outer barrel 10, chamfered at one end and provided with a series of calibration lines 11 on the chamfer surface. An inner conduit 12 extends for the entire length of the venturi and is provided with a threaded portion 13 at the inlet end and a similar threaded portion 14 at the outlet end. Adjacent to the inlet thread 13 is a cylindrical bearing surface 12A formed with an annular slot 16 which contains an "O" ring for maintaining the device leak-proof. Adjacent to the slot 16 is a cutaway portion 17 in which a spring 18 is positioned. The spring presses against a washer 20 and two hardened steel pins 21 and 22. The outer ends of the pins are pressed against a shoulder 23 formed on the inner surface of barrel 10. The inner ends of the pins 21, 22, are held by a cage 24 which slides along the inside surface of a bore 25 which is the main conduit for transporting the fluid. The cage 24 is also secured to one end 26 of an axial pin 27 which is movable in an axial direction with relation to other parts of the venturi. The pin end 26 is secured in cage 24 and pins 21 and 22 by means of a nut 28 which clamps the end of the pin to the cage and to a washer 30.

The outer barrel 10 is mounted on the conduit 12 by means of screw threads 31 which permit rotation of the barrel by an operator without disturbing any other parts of the system. As the barrel 10 is rotated it also moves along the conduit in an axial direction and moves the radial pins and the axial pin 27 with relation to the conduit 12. The other end (downstream) of the pin 27 is movably supported by a spider 32 which is secured to the conduit 12 by means of an expanding washer 33.

A stream lined constriction 34, common to all venturi type meters, is formed on the inner surface of the conduit 12 and acts to constrict the flow of the fluid and to change its pressure as the fluid moves past the axial pin 27. The axial pin is formed with a variable transverse cross section as indicated in the figures and this form cooperates with constriction 34 when adjusted to permit variable amounts of fluid to pass through the conduit. FIG. 2 shows the pin 27 moved to the left, thereby presenting a constriction which permits a minimum of fluid to pass through the tube. FIG. 5 shows the same parts but with the axial pin moved to the right to permit a maximum flow of fluid.

Venturi tubes can measure rate of flow of fluids only when the pressure of one or both sides of the tube is known. For low rates of flow, two pressure measurements must be obtained and the difference between these pressures is proportional to the flow of the fluid. For higher rates of flow, where turbulence and cavitation are created, only one pressure measurement is necessary. Such a pressure measuring device 35 is indicated in FIG. 1. This device may be the well-known Bourdon type of gauge or any of the pressure transducers well-known in the art. The pressure indicator 35 is joined to conduit 12 by a pipe 36 which may be positioned anywhere in the upstream conduit adjacent to constriction 34.

FIGS. 2 to 5 show the preferred form of the invention where the axial pin 27 is coupled to the rotatable barrel 10 so that a motion of the barrel moves the pin in an axial direction. FIGS. 6, 7, and 8 show an alternate arrangement, similar to the above described type, wherein the outer constriction 40 is coupled to the radial pins 21 and 22 so that it moves in relationship to an axial pin 41 which is secured within the conduit. In this type of adjustment, the constriction 40 is movable within the bore 25 and contains two cavities 42, 43, which hold the radial pins so that the constriction 40 moves in an axial direction as the radial pins are moved by the barrel 10. The result is the same in either case. The axial pin 41 may be secured to the downstream spider 32 by means of a streamlined nut 44. The upstream spider 45 may be press fitted to the upper end 26 of the pin but is designed for movement within the bore 25 to accomodate for temperature changes.

When the adjustable venturi is used with fluids under very high pressure or with dangerous fluids, a vent may be built into the design as indicated in FIG. 9. In this alternate arrangement two O rings 47 and 48 are provided and between them an annular slot 50 is cut in the outer surface of the conduit 12. This slot is connected to an external pipe 51 by means of a small passageway 52. The pipe 51 may be connected to a drain or to any disposal tank away from the personnel so that the fumes from the escaping fluid will not be objectionable. It will be obvious that fluid which leaks by the first "O" ring 48 will then be drained off by pipe 51 and there will be no tendency for the fluid to leak by the second "0" ring 47.

In some cases where the mixture of a neutral gas or other fluid will not contaminate the fluid in the conduit, such a neutral fluid may be pumped into pipe 51 under pressure, this pressure being substantially the same as the pressure within conduit 12. Such an arrangement provides equal pressures on both sides of O ring 48 and therefore no leakage can result.

From the above it will be evident that a novel type of adjustable venturi has been described and illustrated. It is obvious that an operator can adjust the constriction from a maximum to a minimum rate of flow without stopping the flow of the fluid and without changing any other part of the conduit system.

The foregoing disclosure and drawings are merely illustrative of the principles of this invention and are not to be interpreted in a limiting sense. The only limitations are to be determined from the scope of the appended claims.

I claim:

1. An adjustable in-line venturi for measuring the flow of fluids through a conduit comprising; a constricted portion secured to the inner surface of the conduit and in axial alignment therewith; an axial pin having a varying transverse cross sectional area positioned within the conduit adjacent to the constricted portion, said pin movably supported at both ends and in axial alignment with the conduit; means for measuring the fluid pressure in the upstream end of the conduit; mechanical means for varying the relative position of the pin and the constricted portions, said mechanical means including an axially aligned rotatable cylinder on the outside of the venturi with coupling means connected to the pin for changing its position relative to the constricted portion and with internal screw threads which mesh with external screw threads on the conduit.

2. An adjustable venturi as claimed in claim 1 wherein said coupling means includes a pair of radial pins secured to a portion of said axial pin and resiliently limiting aganst a ledge on the rotatable cylinder.

3. An adjustable venturi as claimed in claim 1 wherein said axial pin is secured to the conduit and wherein said constricted portion is axially movable therewith, said mechanical means including a pair of radial pins coupled to the constricted portion.

References Cited by the Examiner

UNITED STATES PATENTS

| | | | |
|---|---|---|---|
| 1,862,111 | 6/32 | Conran | 138—46 |
| 2,240,119 | 4/41 | Montbomery et al. | 73—213 |
| 2,606,573 | 8/52 | Brobeck et al. | 73—213 X |

RICHARD C. QUEISSER, *Primary Examiner.*

ROBERT L. EVANS, *Examiner.*